Aug. 11, 1936.   F. W. CHAMBERLIN   2,050,273

MIXING VALVE

Filed Jan. 21, 1935

INVENTOR
Francis William Chamberlin
BY

ATTORNEY

Patented Aug. 11, 1936

2,050,273

UNITED STATES PATENT OFFICE 2,050,273

MIXING VALVE

Francis William Chamberlin, Hastings, Nebr.

Application January 21, 1935, Serial No. 2,696

7 Claims. (Cl. 277—31)

My invention relates to improvements in mixing valves in which a single spindle with suitable handle actuates by rotation a compartment valve and by discontinuous oscillation a conical plug containing said compartment valve, the entire mechanism operating within a housing through which this rotating and discontinuously oscillating spindle extends; and the objects of my improvements are, first, to provide (a) a variable discharge of one liquid, (b) a variable discharge of another liquid, or (c) a variable discharge of any possible mixture of the two liquids or of two identical liquids at different temperatures; second, to afford facilities for changing the proportion in which the two liquids may be mixing without varying the rate at which they may be discharging; third, to afford facilities for varying the rate at which two liquids may be discharging without changing the proportion in which they may be mixing; and fourth, to provide a single spindle with suitable handle having a distinctively twofold movement to perform the above mentioned operations.

I attain these objects by the mechanism illustrated in the accompanying drawing, in which—

Figure 2:
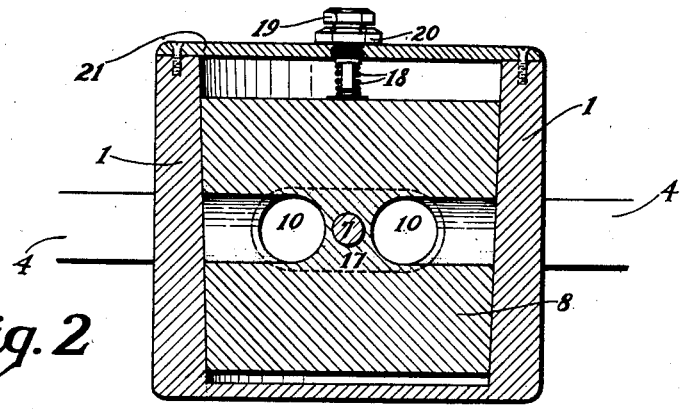
Figure 1:
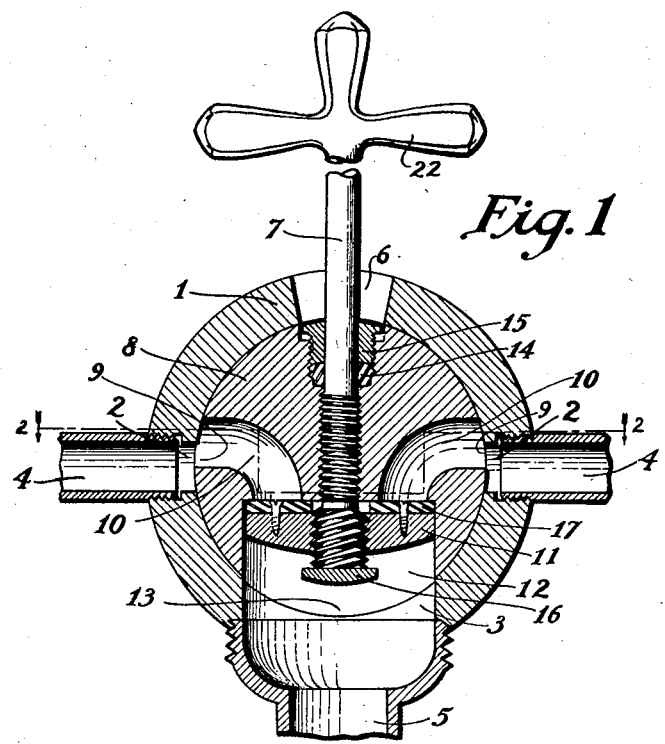

Figure 1 is a vertical section of the entire valve and Figure 2 a horizontal section of the entire valve.

Similar numerals refer to similar parts or chambers throughout the several views.

Referring now to the drawing, 1 represents the housing, having a conical inner surface, and provided with inlets 2 2, and an outlet 3, into which fit respectively inlet pipes 4 4 and an outlet pipe 5, said housing 1 having slotted opening 6 cut through its wall opposite outlet opening 3. Through slotted opening 6 spindle 7 oscillates discontinuously, actuating by its oscillatory movement conical plug 8, said plug 8 fitting entirely within housing 1 in such a manner that it may be oscillated discontinuously by spindle 7 in slot 6 without permitting any leakage of liquids between the conical surfaces of housing 1 and plug 8. Plug 8 contains inlet openings 9 9 overlapping aforementioned inlets 2 2 in housing 1, and chambers 10 10 leading through compartment valve 11 and mixing chamber 12 to outlet opening 13, which likewise matches aforementioned outlet 3. Discontinuous oscillatory movement of spindle 7, in slot 6, causes plug 8 to turn to the right or left, permitting liquids from inlets 2 2 in housing 1 to pass through related inlet openings 9 9 in plug 8 in amounts varying from maximum flow of one liquid and none of the other to no flow of the one liquid and maximum flow of the other. Outlet 3 in housing 1 and outlet opening 13 in plug 8 overlap in such a manner that an unhindered discharge from mixing chamber 12 to outlet pipe 5 is permitted at all times. Suitable means are provided for preventing leakage around spindle 7 by packing 14 and packing nut 15. Cap screw 16 prevents valve plate 11 from backing off from spindle 7 as spindle 7 is rotated. Valve gasket 17 is secured to valve plate 11 by small screws. Conical plug 8 is held in proper position within housing 1 by spring 18, set screw 19, and lock nut 20. Cover plate 21 retaining set screw 19, is securely fastened to housing 1. Spindle 7 is fitted with a suitable handle 22 by which it may be rotated and oscillated discontinuously.

A detailed description of the operation of this valve follows. Consider the compartment valve as entirely open, thereby permitting the maximum discharge from the mixing chamber 12 and outlet opening 13. With this setting for maximum discharge, consider the single spindle as regards its discontinuous oscillatory movement. With the single spindle at one end of slot 6 it will be seen that 9, one of the inlet openings in plug 8, matches 2, one of the inlets in housing 1, permitting maximum flow from inlet pipe 4 through chamber 10, mixing chamber 12, and outlet opening 13. At the same time it can be seen that inlet opening 9 on the opposite side in plug 8 does not match at all inlet 2 on the opposite side in housing 1, but has moved just past inlet 2 preventing opposite inlet pipe 4 from communicating with similar aforementioned chambers and outlet. Bear in mind throughout this description of operation that the maximum discharge is being permitted. Now by causing the single spindle to swing slightly toward the opposite end of slot 6, it will be seen that inlet opening 9 in plug 8 does not now entirely match inlet 2 in housing 1, thereby reducing the flow from inlet pipe 4 through the aforementioned chambers and outlet, but it will also be noticed that related inlet opening 9 on the opposite side in plug 8 has begun to match inlet 2 on the opposite side in housing 1. Note that the sum of the open areas of the matched openings 2, 9 and 2, 9 on opposite sides in housing 1 and plug 8 always remains a constant equal to the cross-sectional area of either inlet pipe 4. It can be seen that as single spindle 7 is swung farther toward the opposite end of slot 6 the flow from one inlet pipe 4 is gradually diminished and the flow from the opposite inlet pipe 4 is gradually increased, thereby permitting any desirable mixture. Had the single spindle been at the opposite end of slot 6 initially the foregoing description of operation would also be applicable. The mixture has been varied by swinging the spindle from one end of the slot to the other, the discharge from the valve having remained at maximum throughout. It can now readily be seen that while the single spindle is being moved from one end of the slot to the other, or while it is stationary, the same may be rotated to vary the discharge of the mixture from the mixing chamber 12 without in any manner affecting the proportion in which the two liquids may be mixing.

This invention has been designed with its adaptation to plumbing fixtures in view. It can however be adapted to other fields where simplicity of speedy operation in mixing two liquids is desirable. In the plumbing field where hot and cold water are jointly dispensed its superiority is apparent in that by one handle actuating a spindle having two movements, any desired delivery of hot water, cold water, or any possible mixture of the two can be obtained. That which I assert is new and novel is the combination of two movements for one spindle, each movement being independent of the other and permitting separate control of delivery and mixture.

I am aware that prior to my invention mixing valves have been made operated by a single spindle but an exhaustive search has not revealed a mixing valve operated by a single spindle having a distinctively twofold movement, each movement being entirely independent of the other, one controlling delivery and the other, mixture. Therefore, I do not claim broadly a mixing valve operated by a single spindle, but I claim:

1. A mixing valve comprising a housing, a conical plug movable within said housing, a compartment valve built within said conical plug and a single spindle provided with a suitable handle adapted to rotate thereby actuating said compartment valve and adapted for discontinuous arcual oscillations, thereby moving said conical plug within said housing.

2. A mixing valve comprising a housing, a conical plug movable within said housing, a compartment valve built within said conical plug and a single spindle provided with a suitable handle the rotation of which actuates the compartment valve by means of two sets of opposed threads, the discontinuous arcual oscillation of which moves the conical plug within said housing.

3. A mixing valve comprising a housing, a conical plug movable within said housing, a single spindle provided with a suitable handle and adapted to rotate while describing discontinuous arcual oscillations, and a compartment valve built within said conical plug, actuated by the rotation of said spindle and operative in any position said spindle may take while describing arcual oscillations.

4. A mixing valve comprising a rotating and discontinuously oscillating spindle to which is secured a suitable handle and adapted to actuate jointly or severally both a compartment valve by rotation of the single spindle, and a plurality of overlapping inlets and outlets, by discontinuous oscillation of the single spindle.

5. A mixing valve comprising a housing and a conical plug movable entirely within said housing and provided with a single spindle, extending through a slot in said housing thereby permitting the single spindle to oscillate discontinuously, and provided with a suitable handle for rotating and oscillating the single spindle discontinuously.

6. A mixing valve comprising a housing provided with inlet openings, a conical plug movable within said housing and provided with inner chambers, a compartment valve built within said conical plug, a rotating and discontinuously oscillating spindle and a valve operating mechanism in which the valve gasket and plate seat by being raised and unseat by being lowered on said spindle simultaneously with the raising and lowering of said spindle in said conical plug of which the valve seat is part, actuation of said mechanism being effected by rotation of said spindle to which a suitable handle is secured.

7. A mixing valve comprising a housing, a conical plug movable in and entirely encased by said housing, said housing and plug having ports adapted to lap variously for variable mixing of two liquids admitted through respective ports of the housing, and for controlled delivery of the mixture a compartment valve actuated vertically in the plug to control the flow of liquid through the ports of the plug, said plug being closed at both ends and held positively by a spring and set screw, inside said housing, whose inner surface is conical, a single spindle to which is secured a suitable handle extending from a compartment valve it actuates in said plug through a slot in said housing thereby permitting the said spindle to be rotated and oscillated discontinuously.

FRANCIS WILLIAM CHAMBERLIN.